(12) United States Patent
Andersson et al.

(10) Patent No.: US 11,072,293 B2
(45) Date of Patent: Jul. 27, 2021

(54) LOAD CARRIER FOOT

(71) Applicant: Thule Sweden AB, Hillerstorp (SE)

(72) Inventors: Stefan Andersson, Varnamo (SE);
Fredrik Larsson, Vaggeryd (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 16/954,905

(22) PCT Filed: Dec. 18, 2018

(86) PCT No.: PCT/EP2018/085439
§ 371 (c)(1),
(2) Date: Jun. 17, 2020

(87) PCT Pub. No.: WO2019/121646
PCT Pub. Date: Jun. 27, 2019

(65) Prior Publication Data
US 2020/0377034 A1    Dec. 3, 2020

(30) Foreign Application Priority Data
Dec. 19, 2017 (EP) ...................................... 17208333

(51) Int. Cl.
*B60R 9/058* (2006.01)

(52) U.S. Cl.
CPC .................................... *B60R 9/058* (2013.01)

(58) Field of Classification Search
CPC . B60R 9/04; B60R 9/058; B60R 9/052; F16B 2/10; F16B 1/02; B60P 7/0815; B60P 7/0838
See application file for complete search history.

(56) References Cited

U.S. PATENT DOCUMENTS

| | | | | |
|---|---|---|---|---|
| 4,239,139 A | * | 12/1980 | Bott | B60R 9/045 224/324 |
| 4,496,089 A | * | 1/1985 | Eklund | B60R 9/058 224/320 |
| 4,877,169 A | | 10/1989 | Grim | |
| 4,995,538 A | * | 2/1991 | Marengo | B60R 9/045 224/315 |

(Continued)

FOREIGN PATENT DOCUMENTS

| | | | | |
|---|---|---|---|---|
| DE | 2013-D44921 | * | 3/2013 | B60R 9/058 |
| EP | 3 106 351 A1 | | 12/2016 | |

(Continued)

OTHER PUBLICATIONS

International Search Report and Written Opinion of the International Searching Authority for International Application No. PCT/EP2018/085439, European Patent Office (EPO), dated Jan. 22, 2019, 13 pages.

(Continued)

*Primary Examiner* — Brian D Nash
(74) *Attorney, Agent, or Firm* — Sterne, Kessler, Goldstein & Fox P.L.L.C.

(57) ABSTRACT

Disclosed is a load carrier foot for supporting a load bar on a vehicle. The load carrier foot comprises a locking mechanism for releasably locking the load bar on the load carrier foot. Furthermore, the locking mechanism is configured to automatically return into a locking state in which the load bar is locked on the load carrier foot.

23 Claims, 4 Drawing Sheets

(56) References Cited

U.S. PATENT DOCUMENTS

| | | | | |
|---|---|---|---|---|
| 5,588,573 A * | 12/1996 | Mann | B60R 9/058 224/325 |
| 6,264,082 B1 * | 7/2001 | Lindell | B60R 9/058 224/322 |
| 6,516,985 B1 * | 2/2003 | Lundgren | B60R 9/058 224/322 |
| 7,108,163 B1 * | 9/2006 | Pedrini | B60R 9/12 224/319 |
| 7,156,593 B1 * | 1/2007 | Saward | B60P 7/0815 410/104 |
| 8,720,761 B2 * | 5/2014 | Binder | B60R 9/04 224/557 |
| 10,703,294 B2 * | 7/2020 | Dellock | F16B 21/125 |
| 2005/0051684 A1 * | 3/2005 | Linden | B60R 9/058 248/188.4 |
| 2011/0192870 A1 * | 8/2011 | Michie | B60R 9/048 224/309 |
| 2013/0043288 A1 * | 2/2013 | Hubbard | B60R 9/058 224/331 |
| 2013/0112724 A1 * | 5/2013 | Polewarczyk | B60R 9/045 224/321 |
| 2014/0224850 A1 * | 8/2014 | Lundgren | B60R 9/058 224/322 |
| 2015/0274084 A1 * | 10/2015 | Sarges | B60R 9/058 224/315 |
| 2016/0332581 A1 * | 11/2016 | Almhill | B60R 9/058 |
| 2016/0339849 A1 * | 11/2016 | Almhill | B60R 9/058 |
| 2018/0141481 A1 * | 5/2018 | Gomes | B60P 7/0807 |
| 2019/0232881 A1 * | 8/2019 | Aftanas | B60R 9/052 |
| 2020/0282918 A1 * | 9/2020 | Andersson | B60R 9/04 |
| 2020/0313604 A1 * | 10/2020 | Harris | F24S 25/00 |
| 2020/0377033 A1 * | 12/2020 | Andersson | B60R 9/058 |

FOREIGN PATENT DOCUMENTS

| | | |
|---|---|---|
| EP | 3 243 702 A1 | 11/2017 |
| WO | WO 2008/004936 A1 | 1/2008 |
| WO | WO 2009/038480 A1 | 3/2009 |

OTHER PUBLICATIONS

European Search Report issued in European Application No. 17208333.9, dated May 24, 2018, 4 pages.

* cited by examiner

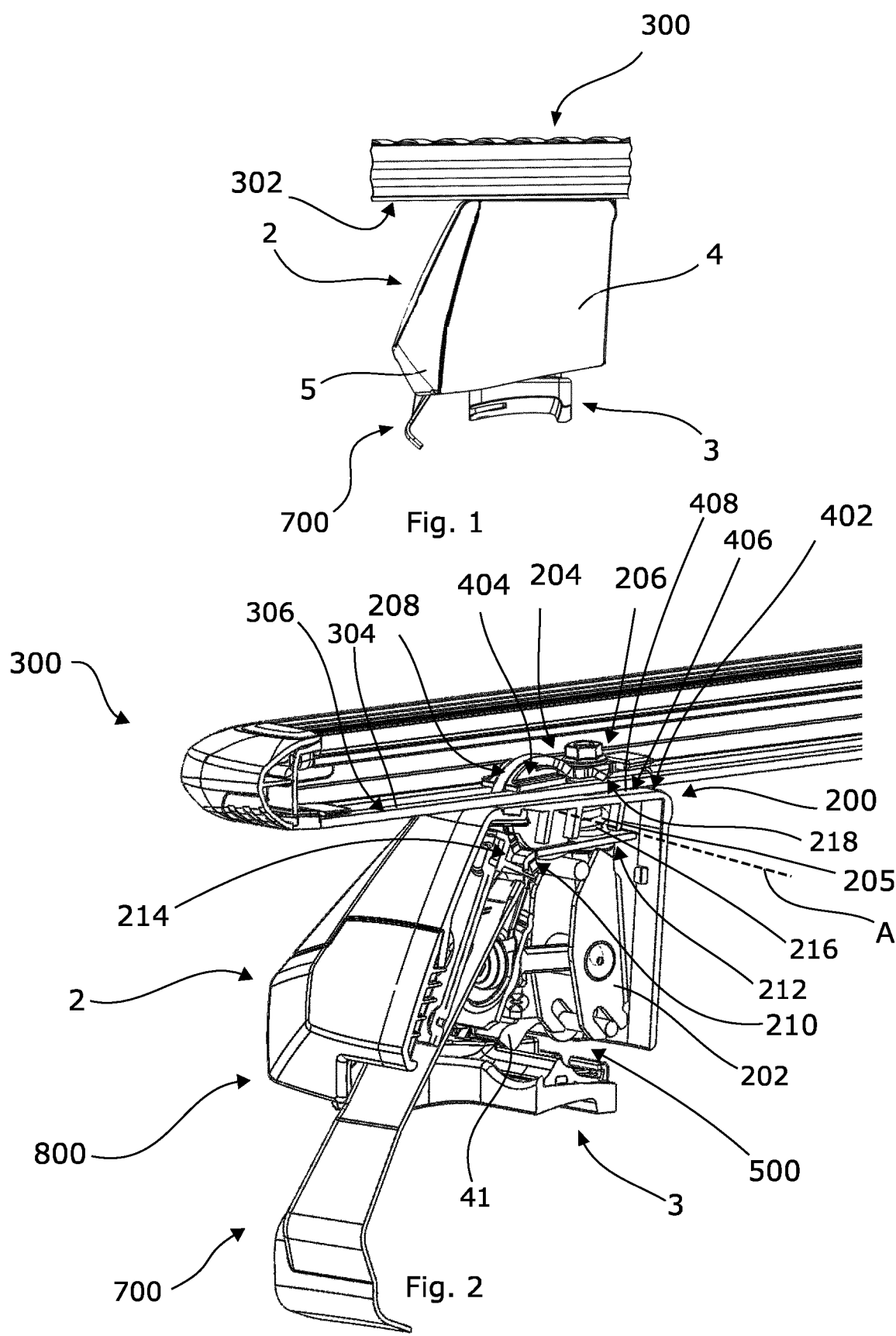

LOAD CARRIER FOOT

FIELD OF THE INVENTION

The invention relates to a load carrier foot for supporting a load bar on a vehicle.

BACKGROUND

Load carriers for vehicles which are mounted on the roofs of the vehicles are widely known in the art. Such load carriers typically comprise a load bar as well as load carrier feet which are coupled to the load bar and adapted to support the load bar on the vehicle roof. For mounting such load carriers, vehicles can comprise roof railings on which the load carrier feet can be fixed or the load carrier feet can be specifically designed to be mounted on roofs without roof railings.

In known load carriers, load bars typically comprise recesses on their lower sides extending in the longitudinal direction of the load bars and configured to accommodate a mounting section of the load carrier foot therein. These recesses have a certain length and allow a positioning of the load carrier foot with respect to the load bar in the longitudinal direction of the load bar. In other words, the distance between two load carrier feet can be adapted by sliding them in the recesses with respect to each other.

The ability of the load carrier feet to slide in the recesses is not always wanted and is in particular not wanted when the load carrier is fixedly clamped on the vehicle. In order to prevent a load carrier foot from sliding in the recess, clamping mechanisms are known which securely clamp the load carrier foot to the load bar when the clamping mechanism is operated. For example, it is known to provide a lever operated clamping mechanism which, when the lever is operated, locks the load carrier foot to the load bar. While such systems allow to properly lock the load carrier foot on the load bar, the operation of such systems is often not very user friendly.

SUMMARY OF THE INVENTION

In view of the above background, it is the object to provide a load carrier foot which addresses the foregoing problems. In particular, it is an object to provide a load carrier foot with enhanced user friendliness.

The object is solved by a load carrier foot according to independent claim 1 and/or according to the following summary. Advantageous further formations are subject of the dependent claims wherein specific further modifications can be gleaned from the following summary.

According to an aspect, a load carrier foot for supporting a load bar on a vehicle is provided. The load carrier foot comprises a locking mechanism for releasably locking the load bar on the load carrier foot. Furthermore, the locking mechanism is configured to automatically return into a locking state in which the load bar is locked on the load carrier foot.

The above configuration of the load carrier foot has the advantage that when the load carrier foot is mounted on the load bar, it remains locked with the load bar unless the locking is released by operation of a user. In this way, an undesired movement of the load carrier foot with respect to the load bar is prevented without the need of any further user action.

In the context of the present subject matter, configured to automatically return into a locking state means that the locking mechanism has the capability to return into the locking state on its own and without user action. On the other hand, a user action is necessary for releasing the locking state. Such a user action can be the operation of a lever, button or other operating means which allows to induce an operating force into the locking mechanism for releasing the locking state.

Preferably, the locking mechanism comprises a locking member configured to engage with the load bar and a biasing member for continuously applying an engaging force on the locking member.

By using a locking member and a biasing member for applying an engaging force on the locking member, the above-mentioned capability of the load carrier foot is achieved with a simple and cost efficient construction.

Generally, the locking member can be any means which is configured to engage with the load bar. Preferably, the locking member is configured to engage with the load bar by friction fit or positive locking. In the context of the present subject matter, friction fit relates to a condition in which the locking between locking member and load bar is achieved due to friction between the locking member and the load bar. Positive locking, also referred to as form fit, relates to a condition in which the locking between locking member and load bar is achieved by an engagement in which the locking member is brought into a position where it forms an abutment for the load bar and thus prevents a movement of the load bar.

The biasing member can be a spring. However, it is generally possible to use other means which are configured to continuously apply a force on the locking member. Such a means does not necessarily have to be a single element but can also be a mechanism consisting of an elastic element and a force transfer element or a mechanism coupled to the locking member. Such a force transfer element can be a bar or a wire, for instance.

Preferably, the locking member is supported rotatable about a rotational axis. Accordingly, the locking member can be rotated about the rotational axis in order to lock and unlock the load carrier foot on the load bar. The rotational axis can be arranged substantially perpendicular to a longitudinal extension direction of the load bar. For example, the locking member can be supported in a seesaw-like manner, that is by a single pivot point. For that, the locking member can comprise a pivot pin or an opening for accommodating a pivot pin. The pivot pin can be integrally formed with the locking member or can be coupled to the locking member so as to integrally rotate therewith. On the other hand, the pivot pin can be non-rotatably fixed and the locking member can be configured to rotate relative to the pivot pin. Instead of a pivot pin, any suitable support allowing the latter movement of the locking member can be used. For example, a cylindrically shaped supporting surface can be provided on which at least a portion of the locking member slides about the rotational axis.

The rotational axis can be arranged along the width of the load bar which in the context of the present subject matter means that the rotational axis can extend in the longitudinal direction of a vehicle when the load carrier comprising the load carrier foot and the load bar as described before is mounted on the vehicle. The width direction can also be defined as a direction which is substantially perpendicular to the longitudinal extension direction of the load bar and substantially parallel to a loading plane which is defined by two load bars mounted on the roof of the vehicle at a predefined distance from each other.

Preferably, the load carrier foot further comprises an operating member for transferring the locking mechanism into a release state in which the load bar is unlocked from the load carrier foot. In the context of the present subject matter, unlocked from the load carrier foot means that the load bar is a least movable with respect to the load carrier foot. Thus, the locking member can be operatively coupled with the locking member in order to move the same. The operating member can be directly coupled with the locking member and can even be integrally formed with the locking member. In other words, the locking member can be a portion of the operating member. On the other hand, the operating member can also be directly coupled with the locking member by a suitable force transmitting member or mechanism.

Preferably, the operating member is configured to transfer a release force applied on the operating member by a user onto the locking member in a direction opposite to the engaging direction. In other words, the operation of the operating member leads to a generation of a counterforce acting against the engaging force.

Preferably, the locking member comprises an engaging section adapted to contact the load bar and force transmittingly coupled to a first portion of the operating member. The locking member can comprise a supporting section which is adapted to rotatably support the locking member on a support member of the load carrier foot. The locking member can comprise a coupling section which is force transmittingly coupled to a second portion of the operating member.

The locking member, in particular the engaging section, the supporting section and a coupling section can be integrally formed. For example, the locking member can be formed by bending a sheet metal.

The engaging section can be specifically designed to allow a proper engagement with a corresponding section in the load bar. For example, the engaging section can comprise teeth for contacting a surface on the load bar or for engaging with corresponding recesses formed in the load bar.

Furthermore, the engaging section can comprise an opening for fixing a force transfer member, e.g. pulling member thereto. The pulling member can be a pull rod. In case an opening is provided in the supporting section, the teeth can be arranged on opposite sides of the opening, i.e. in width direction of the load carrier foot and in width direction of the load bar. Furthermore, the tips of the teeth can be oriented such that they face in a direction which is substantially parallel to a middle axis of the opening. The engaging section can be force transmittingly coupled to a first portion of the operating member. For example, the engaging section can be force transmittingly coupled to the first portion of the operating member by means of the force transfer member as mentioned before. In this way, it is possible to apply a force, e.g. a pulling force, on the engaging section by way of a movement of the operating member.

In order to rotatably support the locking member on the support member of the load carrier foot, the supporting section can be formed in the shape of a circular arc. In other words, the supporting section can comprise a curved portion or an arc portion or section which can be brought in contact with the support member of the load carrier foot. The arc portion comprises an inner wall which extends about the curvature centre or curvature centre axis of the arc portion. The inner wall, which can also be referred to as sliding wall, can be slidingly supported on a correspondingly curved supporting section on the support member of the load carrier foot. In this way, a hinged coupling between the support member and the locking member can be achieved. However, it is also possible to hingedly couple the locking member on the support member in a different manner. For example, the locking member can be coupled to the support member by means of a pivot pin about which the locking member can be rotated. The support member can be a rear cover of the load carrier foot, i.e. a cover which is arranged on the vehicle side or which is facing towards the vehicle center when the load carrier foot is mounted on the vehicle. The load carrier foot can comprise a foot pad for contacting the vehicle roof and for transferring a load onto the vehicle roof. The support member, e.g. the rear cover, can be movably, e.g. rotatably, supported on the foot pad. More precisely, a lower portion of the support member can be specifically designed to be supported on an upper side of the foot pad. Furthermore, the support member can be configured to support a load bar thereon. In other words, the upper portion of the support member can be configured to support a load bar thereon. Thus, the support member is able to transfer a load received from a load bar onto the foot pad. In this way, a major part of a normal force applied on the load carrier foot by the load bar is directly transferred to the foot pad by means of the support member. The configuration can be such that the foot pad only receives forces from the support member, e.g. the rear cover.

As mentioned before, the locking member can comprise a coupling section which can be force transmittingly coupled to a second portion of the operating member. For example, the coupling section can be directly force transmittingly coupled to the second portion of the operating member. For that, the coupling section can comprise a recess which is hookable with a hook provided in the operating member. An inverse arrangement of hook and recess is also possible. By way of such a configuration, it is preferably possible to apply a pulling force on the coupling section by way of a movement of the operating member in a second direction.

Preferably, the engaging section is adapted to be arranged inside the load bar and to engage with or apply pressure on an interior surface of the load bar. For that, the locking member can be arranged on the load carrier foot such that it can extend through a recess formed in the load bar, when the load bar is mounted on the load carrier foot. The engaging section can be formed as described before and can be an integral part of the above described locking member. The engaging section is arranged such that a distance between the same and the support member can be varied. The locking member is formed and arranged such that the engaging section remains inside the load bar independent from the position or orientation of the locking member on the support member.

Preferably, the locking mechanism comprises a force transfer member, preferably a threaded bolt or screw, coupled to the engaging section at one end and to the first portion of the operating member at a second end. The force transfer member can be the above described pulling member. On the other hand, any member which is able to at least transfer a sufficiently high pulling force can be suitably used as force transfer member. As an example, the force transfer member can be a threaded rod coupled to the engaging section by means of a nut and having a head portion which is supported on an inner surface of the operating member.

Preferably, the biasing member is a coil spring wound around the force transfer member. For example, the coil spring can be arranged such that one end is supported on an inner surface of the support member, e.g. the rear cover of a load carrier foot, on which the load bar is supported and one end can be supported against a supporting member or operating member. In this way, the supporting member and the force transfer member are biased in such a manner that the engaging section is pulled towards the support member, e.g. the rear cover, and thus brought in contact with an inner lower wall of the load bar and pushes the same against the support member. In other words, the engaging section is spring-biased towards a clamping state and, therefore, automatically returns into that state.

Preferably, the support member comprises a supporting portion adapted to contact an outer surface of the load bar. The supporting portion and the engaging section can form a clamping section for fixedly holding a wall portion of the load bar between them. The supporting portion can comprise a supporting surface facing the engaging section. In other words, a wall portion of the load bar can be accommodated between the supporting surface and the engaging section. The engaging section is pretensioned so as to be pulled towards the supporting surface in order to press the wall portion of the load bar onto the supporting surface.

Preferably, the support member comprises a pivot portion, preferably having a substantially cylindrical shape and adapted to support the supporting section pivotably about the rotational axis, wherein the pivot portion and the supporting portion are preferably integrally formed.

Preferably, the locking mechanism is further configured to take a securing state in which the engaging force on the locking member is increased. Thus, the securing state can be a state in which an additional force is applied on the locking member so that the clamping force is increased.

Preferably, the load carrier foot further comprises a clamping mechanism for clamping the load carrier foot to the vehicle. The clamping mechanism can be operatively coupled to the locking mechanism such that the engaging force on the locking member is increased upon tightening the clamping mechanism. Accordingly, a securing state in which the engaging force on the locking member is increased can be achieved by an operation of the clamping mechanism. Consequently, when the load carrier foot is securely clamped on a vehicle, the locking mechanism is in the securing state and remains in this state until the clamping mechanism is released.

Preferably, the locking mechanism is further configured to take a securing state in which a movement of the locking member is blocked. Alternatively or in addition, the locking mechanism is configured to take a securing state in which a movement of the operating member is blocked. Accordingly, it is possible to provide a securing state by locking a movement of the locking member or of the operating member in a direction in which the engaging section is disengaged from the load bar.

Preferably, the operating member comprises an operating portion, preferably two operating portions. The operating portion preferably comprises at least one push surface configured for thumb operation. According to an example, the operating portion comprises two push surfaces. The operating portions can be integrally formed such that they are accessible for a user and not obstructed by further elements of the load carrier foot other than a covering. For example, the load carrier foot can comprise a load carrier bracket for fixing the load carrier foot to the roof of a vehicle. In addition, the load carrier foot can comprise a holder for holding such a load carrier bracket. The operating member can thus be configured so that neither the load carrier bracket nor the holder obstruct access to the operating portion. For example, the operating member can be formed such that at least one operating portion, preferably both operating portions protrude laterally so that a user is able to operate them by laterally passing a thumb by the holder or bracket and pushing against the operating portion. The direction in which the operating portion protrudes laterally can be the width direction of the load carrier foot, i.e. a width direction of a load bar supported thereon, or a longitudinal direction of the vehicle when the load carrier foot is mounted on the vehicle.

BRIEF DESCRIPTION OF THE DRAWINGS

FIG. 1 shows side view of an assembly comprising a load carrier foot according to an embodiment.

FIG. 2 shows a perspective sectional view of the assembly of FIG. 1.

DETAILED DESCRIPTION OF EMBODIMENTS

Figure 3:
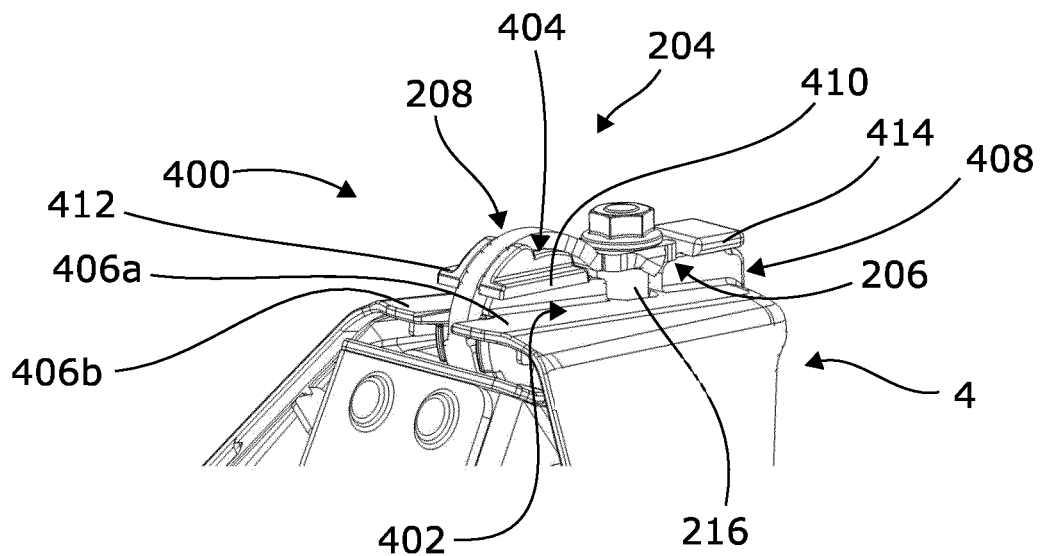
FIG. 3 shows a perspective enlarged view of an upper portion of the load carrier foot of FIG. 1.

In the following, an embodiment as well as modifications of the present subject matter will be described with reference to the drawings. It is to be noted that similar elements in the drawings are denoted with the same reference signs.

FIG. 1 shows a side view of an assembly comprising a load carrier foot 2 according to an embodiment. A load bar 300 is supported on an upper portion of the load carrier foot 2. More precisely, an outer surface 302 of the load bar 300 is supported on the upper portion of the load carrier foot 2. Furthermore, a load carrier bracket 700 is inserted into and fixedly held in the load carrier foot 2. The load carrier foot 2 further comprises a foot pad 3. The foot pad 3 is configured to be supported on the roof of a vehicle. As is further shown in FIG. 1, the load carrier foot 2 comprises a front cover 5 and a rear cover 4 which cover an interior mechanism of the load carrier foot 2.

FIG. 2 shows a sectional view of a load carrier comprising a load bar 300, a load carrier foot 2 supporting the load bar 300 and a load carrier bracket 700. The load carrier foot 2 comprises a locking mechanism 200 for locking the load bar 300 on the load carrier foot 2, more precisely for clamping the load bar 300 on a supporting portion 402 of the load carrier foot 2. In the disclosed configuration, the supporting portion 402 is an integral part of the rear cover 4 of the load carrier foot 2. The rear cover 4 can also be referred to as support member 400 for supporting the load bar thereon. The supporting portion 402 comprises a supporting surface 406 formed in the rear cover 4. Accordingly, the rear cover 4 acts as a support for supporting the load bar 300. In other words, the load bar 300 is supported on an upper portion of the rear cover 4. The rear cover 4 is supported on the foot pad 3. More precisely, the rear cover 4 comprises a coupling portion 41 which is engaged with the foot pad 3.

Figure 4:
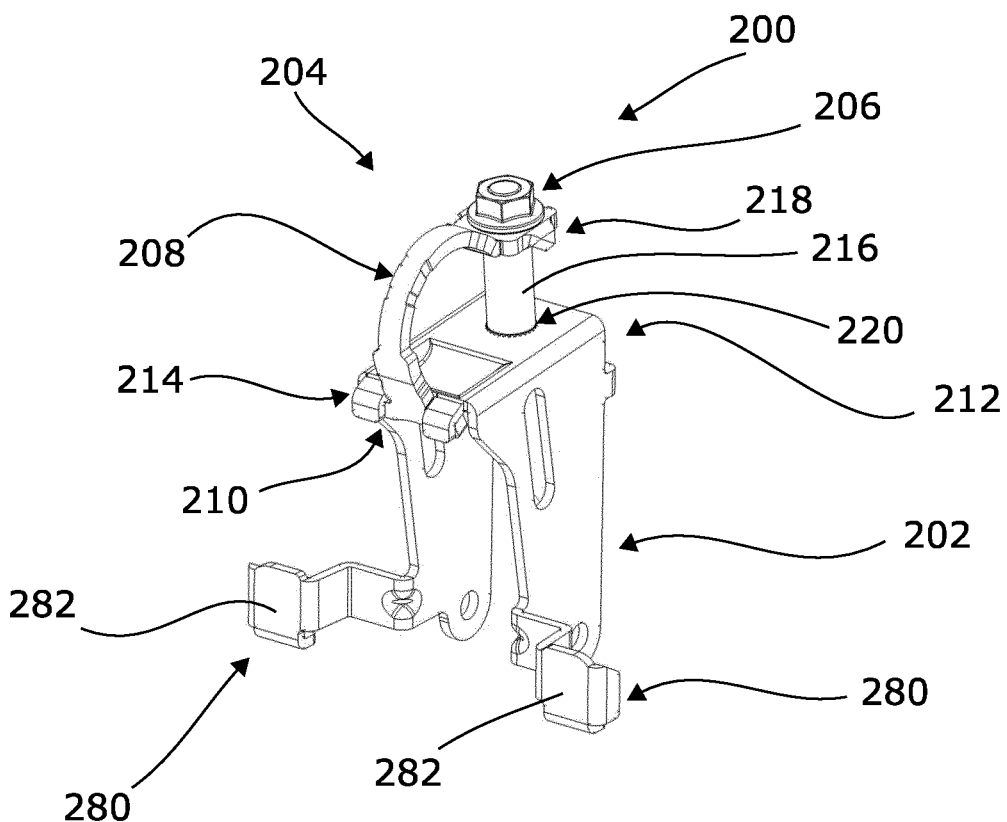
FIG. 4 shows a perspective view of components of a locking mechanism of the load carrier foot.

Components of the locking mechanism 200 are shown in FIG. 4, for instance. The locking mechanism 200 comprises a locking member 204 which is configured to engage with the load bar 300. The locking member 204 comprises a bracket-like shape with an engaging section 206 adapted to contact the load bar 300, a circularly curved supporting section 208 configured to support the locking member 204 pivotably about a rotational axis A and a coupling section 210. The engaging section 206 and the coupling section 210 are both coupled to a supporting member 202. The supporting member 202 can also be referred to as operating member as an operation of the same leads to a movement of the locking member 204.

The engaging section 206 is coupled to a first portion 212 of the operating member 202 and the coupling section 210 is coupled to a second portion 214 of the operating member 202. The first portion 212 and the second portion 214 are arranged at a distance from each other in a direction substantially perpendicular to the rotational axis A.

The engaging section 206 comprises a toothed portion 218 which is adapted to contact a portion of the load bar 300, more precisely an inner wall of a wall portion 304. The engaging section 206 is coupled to the first portion 212 of the operating member 202 by means of a force transfer member 216 embodied as a rod in the present configuration. The force transfer member 216 is arranged skew to the rotational axis A. In other words, the force transfer member 216 extends perpendicular to the rotational axis A and does not intersect with the same. Accordingly, the locking member 204, the force transfer member 216 and the operating member 202 are arranged to form of a closed loop about the rotational axis A.

As is shown in FIG. 3, the rear cover 4 is a support member 400 for supporting the load bar 300 and for supporting the locking member 204. The rear cover 4 comprises a supporting portion 402 having a supporting surface 406. The supporting surface 406 is formed to support an outer surface 302 of the load bar 300. Here, the supporting surface 406 is formed such that it is substantially horizontally arranged when the load carrier foot 2 is fixed on a vehicle.

Furthermore, the supporting surface 406 is formed by two partial surfaces 406a, 406b that are arranged on opposite sides of a guiding ridge 408 which is configured to be inserted into a longitudinal groove 306 in the lower wall of the load bar 300. The guiding ridge 408 is an integral part of the rear cover 4 and protrudes between the partial surfaces 406a, 406b in a direction substantially perpendicular to the partial surfaces 406a, 406b.

The guiding ridge comprises two guiding ridge sections. The force transfer member is provided between the guiding ridge sections. The guiding ridge 408 has a width which is smaller than the width of the groove 306 formed in the load bar 300. At a predetermined distance from the partial surfaces 406a, 406b protrusions 410, 412, 414 are provided on the guiding ridge 408. The protrusions 410, 412, 414 extend substantially parallel to the partial surfaces 406a, 406b. A wall portion 304 of the load bar 300 can be accommodated in a space between the protrusions and the partial surfaces. Accordingly, the upper portion of the rear cover 4 is configured as a sliding shoe for sliding in the longitudinal groove 306 of the load bar 300.

The support member 400 further comprises a pivot portion 404. The pivot portion 404 comprises a cylindrical supporting surface for pivotably supporting the supporting section 208 of the locking member 204. The pivot portion 404 is integrally formed with one of the guiding ridge sections. The inner wall of the supporting section 208 is slidably supported on the cylindrical supporting surface. Accordingly, the pivot portion 404 forms one part of a hinge and the supporting section 208 forms another part of the hinge. This configuration renders the locking member 204 rotatable about rotational axis A which is the center axis of the cylindrical supporting surface. In other words, the locking member 204 is slidable in circumferential direction of the cylindrical supporting surface.

Figure 5:
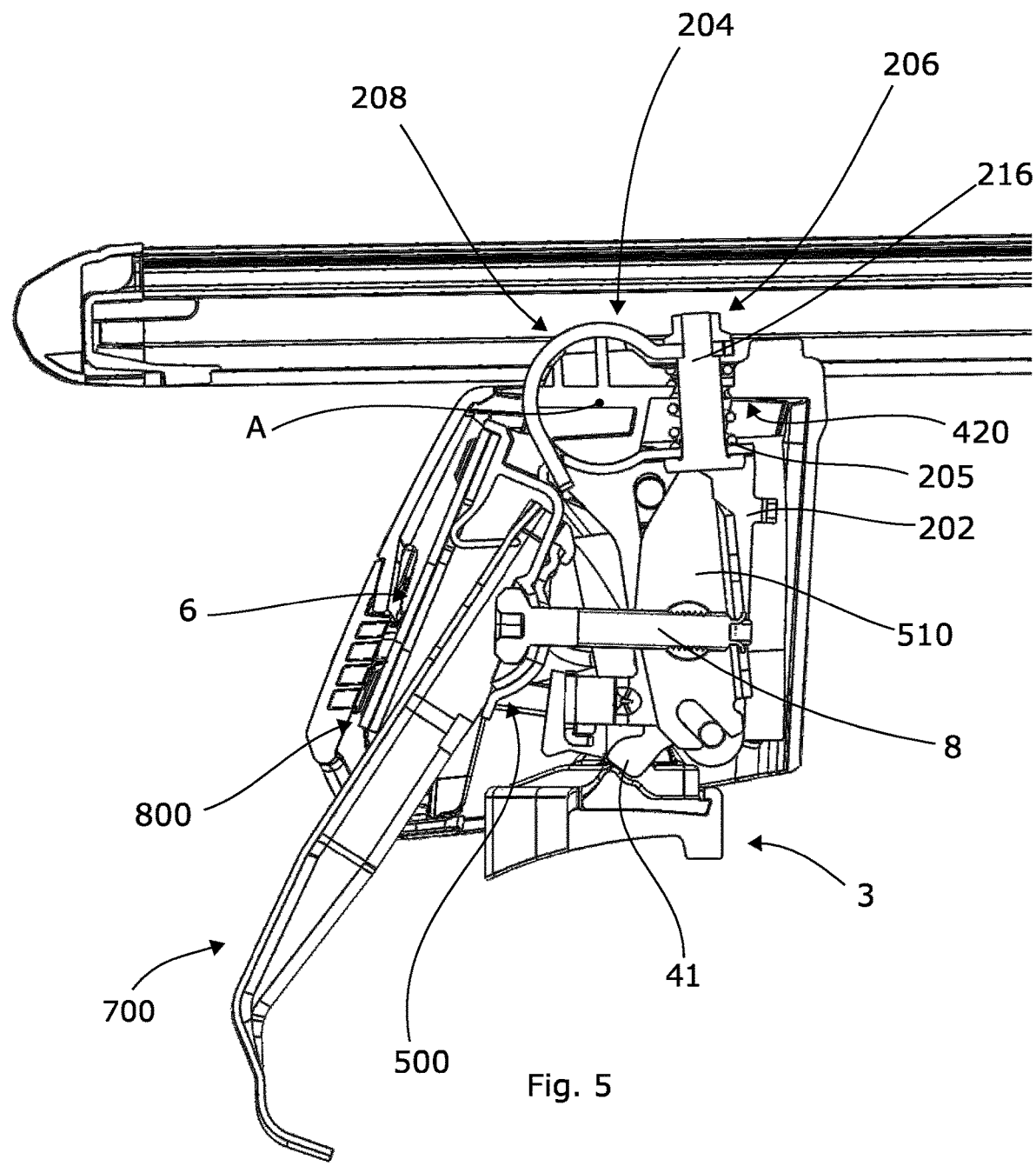
FIG. 5 shows a sectional view of the assembly of FIG. 1.

As is shown in FIGS. 2 and 5, the biasing member 205 is embodied as a coil spring which is wound around the force transfer member 216. One end of the coil spring, the upper end in the drawings, is supported on an inner supporting portion 420 of the rear casing 4 of the load carrier foot 2. The inner supporting portion 420 is a portion in the interior of the rear casing 4 opposite to the supporting surface 406. The other end of the coil spring, the lower end in the drawings, is supported on the supporting member 202 in the area of an edge of an opening 220 for fixing the force transfer member 216.

The coil spring pretensions the operating member 202 and, thus, the force transfer member 216 to move away from the load bar 300. In other words, the coil spring urges the operating member 202, the force transfer member 216 and the locking member 204 in the clockwise direction about rotational axis A. Therefore, the engaging section 206 is pulled downwards towards the inner wall of the load bar 300 and firmly pushes the lower wall portion 304 of the load bar 300 on the supporting surface 406, i.e. the partial supporting surfaces 406a, 406b. Due to this configuration, a normally locked state or locking state is provided which can be released only by pushing the operating member 202 in the direction against the urging force of the coil spring, i.e. in counterclockwise direction in FIGS. 2 and 5. Thus, the locking mechanism 200 is configured to automatically return into the locking state in which the load bar is locked on the load carrier foot.

Figure 6:
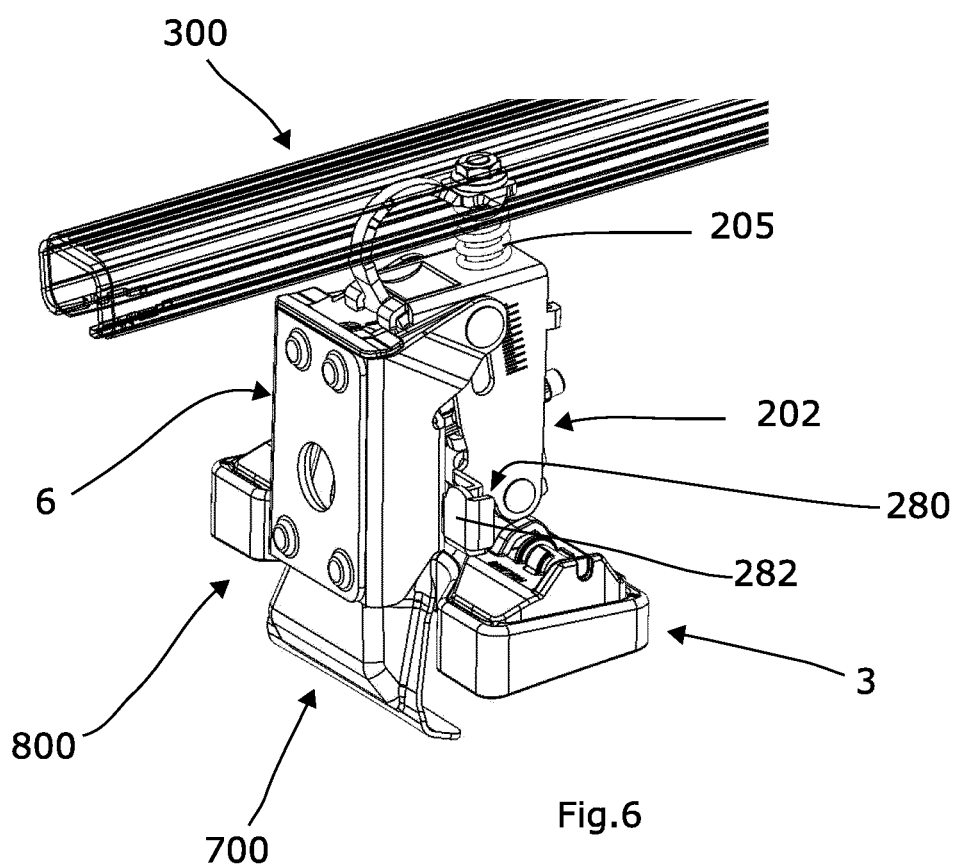
FIG. 6 shows a perspective view of components of the assembly of FIG. 1

In order to operate the operating member 202, the operating member 202 comprises two operating portions 280 comprising push surfaces 282 configured for thumb operation. The operating portions 280 are integrally formed such that they are not obstructed by a holder 6 or load carrier bracket 700 provided in the load carrier foot 2. In other words, when viewed from an operating side of the load carrier foot, i.e. an outer side of the load carrier foot 2 when the same is mounted on a vehicle, and in the longitudinal direction of the load bar 300, the operating portions 280 are arranged laterally from the holder 6 as can be gathered from FIG. 6. In other words, the operating portions 280 are arranged sideways of the holder in the width direction of the load bar 300.

In the configurations shown in FIGS. 2 and 5, the load carrier foot further comprises a clamping mechanism 800. The clamping mechanism 800 is operatively coupled to the locking mechanism 200 such that the clamping force in the locking mechanism 200 is increased upon tightening the clamping mechanism 800.

The clamping mechanism 800 comprises a holder 6, a load carrier bracket 700 received in the holder 6 and a tightening mechanism 500 adapted to generate a tightening force moving the holder 6 and the operating member 202 with respect to each other for tightening the load carrier bracket 700.

The holder 6 is pivotably held on the operating member 202 and force transmittingly coupled to another portion of the operating member 202 by means of the tightening mechanism 500. The tightening mechanism 500 comprises a tightening member 8 and a force distribution member 510 adapted to transfer a force received from the tightening member 8 on the operating member 202. The tightening member is coupled to the force distribution member 510 and the holder 6 such that a rotation of the same moves the force distribution member 510 along the longitudinal axis of the tightening member. Accordingly, by operating the tightening member 8, the force distribution member 510 can be pulled towards the left side in the drawings and consequently pushes the operating member 202 so as to move clockwise about the rotational axis A. This in turn pulls the force transfer member downward and thus applies an additional force on the engaging section 206. Accordingly, when the tightening mechanism 500 is tightened, the locking mechanism 200 is transferred into a locking state in which an operation of the operating member 202 is not possible since a movement of the same is blocked by the force distribution member 510.

The invention claimed is:

1. A load carrier foot for supporting a load bar on a vehicle, said load carrier foot comprising:
    a support member for supporting the load bar thereon; and
    a locking mechanism for releasably locking said load bar on said load carrier foot,
    wherein said locking mechanism comprises a locking member configured to engage with said load bar and a biasing member for continuously applying an engaging force on said locking member, the biasing member configured to automatically return the locking mechanism into a locking state in which said load bar is locked on said load carrier foot,
    wherein said locking mechanism further comprises an operating member for transferring said locking mechanism into a release state in which said load bar is unlocked from said load carrier foot, and
    wherein:
        said locking member comprises an engaging section that is adapted to contact said load bar and that is force transmittingly coupled to a first portion of said operating member, wherein said support member comprises a supporting portion adapted to contact an outer surface of said load bar, said supporting portion and said engaging section forming a clamping section for fixedly holding a wall portion of said load bar between them, or
        said locking mechanism is configured to take a securing state in which a movement of said locking member or a movement of said operating member is blocked.

2. The load carrier foot according to claim 1, wherein said locking member is configured to engage with said load bar by friction fit or positive locking, or wherein said biasing member is a spring.

3. The load carrier foot according to claim 2, wherein said locking member is rotatably supported about a rotational axis which is arranged substantially perpendicular to a longitudinal extension direction of said load bar.

4. The load carrier foot according to claim 3, wherein said rotational axis is arranged along a width of said load bar.

5. The load carrier foot according to claim 2, wherein said locking mechanism is further configured to take a securing state in which said engaging force on said locking member is increased.

6. The load carrier foot according to claim 5, further comprising a clamping mechanism for clamping said load carrier foot to said vehicle, wherein said clamping mechanism is operatively coupled to said locking mechanism such that said engaging force on said locking member is increased upon tightening said clamping mechanism.

7. The load carrier foot according to claim 1, wherein said operating member is configured to transfer a release force applied on said operating member by a user onto said locking member in a direction opposite to a direction of said engaging force.

8. The load carrier foot according to claim 7, wherein said locking member comprises a supporting section adapted to rotatably support said locking member on a support member of said load carrier foot, and a coupling section force transmittingly coupled to a second portion of said operating member.

9. The load carrier foot according to claim 8, wherein said engaging section is adapted to be arranged inside said load bar and to engage with or apply pressure on an interior surface of said load bar.

10. The load carrier foot according to claim 9, wherein said locking mechanism comprises a force transfer member coupled to said engaging section at one end and to said first portion at a second end.

11. The load carrier foot according to claim 10, wherein said biasing member is a coil spring wound around said force transfer member.

12. The load carrier foot according to claim 8, wherein said support member comprises a pivot portion.

13. The load carrier foot according to claim 12, wherein said pivot portion has a substantially cylindrical shape and is adapted to support said supporting section pivotably about a rotational axis which is arranged substantially perpendicular to a longitudinal extension direction of said load bar.

14. The load carrier foot according to claim 13, wherein said pivot portion and said supporting portion are integrally formed.

15. The load carrier foot according to claim 10, wherein said force transfer member is a threaded bolt or a screw.

16. The load carrier foot according to claim 1, wherein said operating member comprises an operating portion configured for thumb operation.

17. The load carrier foot according to claim 16, wherein said operating portion comprises at least one push surface.

18. The load carrier foot according to claim 17, wherein said operating portion comprises two push surfaces.

19. The load carrier foot according to claim 1, wherein:
    said locking member comprises an engaging section that is adapted to contact said load bar and that is force transmittingly coupled to a first portion of said operating member, wherein said support member comprises a supporting portion adapted to contact an outer surface of said load bar, said supporting portion and said engaging section forming a clamping section for fixedly holding a wall portion of said load bar between them, and
    said locking mechanism is configured to take a securing state in which a movement of said locking member or a movement of said operating member is blocked.

20. A load carrier foot for supporting a load bar on a vehicle, the load carrier foot comprising:
    a support member to support the load bar thereon, the support member comprising a supporting portion to contact the load bar; and
    a locking mechanism to releasably lock the load bar on the load carrier foot, the locking mechanism comprising a locking member configured to engage with the load bar, a biasing member configured to apply an engaging force on the locking member, and an operating member configured to transfer the locking mechanism into a release state in which the load bar is unlocked from the load carrier foot,
    wherein the biasing member applies the engaging force on the locking member such that the locking mechanism is configured to automatically return into a locking state in which the load bar is locked on the load carrier foot, and
    wherein the locking member is coupled to a first portion of the operating member and comprises an engaging section to contact the load bar, the engaging section of the locking member and the supporting portion of the support member forming a clamping section to hold a portion of the load bar between them.

21. The load carrier foot according to claim 20, wherein the locking member further comprises:
   a supporting section to support the locking member on a support member of the load carrier foot, and
   a coupling section coupled to a second portion of the operating member.

22. The load carrier foot according to claim 20, wherein the engaging section of the locking member is configured to contact an interior surface of the load bar, and
   wherein the supporting portion of the support member is configured to contact an outer surface of the load bar.

23. The load carrier foot according to claim 20, wherein the operating member is configured to transfer a release force onto the locking member in a direction opposite to a direction of the engaging force.

\* \* \* \* \*